US012592921B2

(12) United States Patent
Jackson et al.

(10) Patent No.: US 12,592,921 B2
(45) Date of Patent: Mar. 31, 2026

(54) ENCODED IDENTIFIERS FOR CREDENTIAL ACCESS AND DISTRIBUTION

(71) Applicant: SAP SE, Walldorf (DE)

(72) Inventors: Toni Jackson, Sydney (AU); John Crowhurst, Brisbane (AU); Karthikeyan Paramasivam Balasubramanian, Singapore (SG)

(73) Assignee: SAP SE, Walldorf (DE)

( * ) Notice: Subject to any disclaimer, the term of this patent is extended or adjusted under 35 U.S.C. 154(b) by 238 days.

(21) Appl. No.: 18/384,174

(22) Filed: Oct. 26, 2023

(65) Prior Publication Data

US 2025/0141866 A1 May 1, 2025

(51) Int. Cl.
H04L 9/40 (2022.01)
(52) U.S. Cl.
CPC ........ H04L 63/0853 (2013.01); H04L 63/102 (2013.01)
(58) Field of Classification Search
CPC ........................... H04L 63/0853; H04L 63/102

USPC .............................................................. 726/4
See application file for complete search history.

(56) References Cited

U.S. PATENT DOCUMENTS 9,818,122 B1 * 11/2017 Farry ..................... G06Q 30/00
2024/0356907 A1 * 10/2024 Lal .......................... G06F 21/33

* cited by examiner

*Primary Examiner* — Anthony D Brown
(74) *Attorney, Agent, or Firm* — SCHWEGMAN LUNDBERG & WOESSNER, P.A.

(57) ABSTRACT

Systems and methods described herein relate to workforce credential management. A request is assigned to a first profile identified by a first identifier. The first profile includes worker credentials. An association between the first profile and a second profile identified by a second identifier in the request is stored. The first identifier is encoded into a digital code that is presentable by a first device associated with the first profile. Capturing of the digital code by a second device associated with the second profile is detected. In response to detecting the capturing of the digital code by the second device, the association between the first profile and the second profile is identified and at least a subset of the worker credentials is transmitted to the second device.

20 Claims, 8 Drawing Sheets

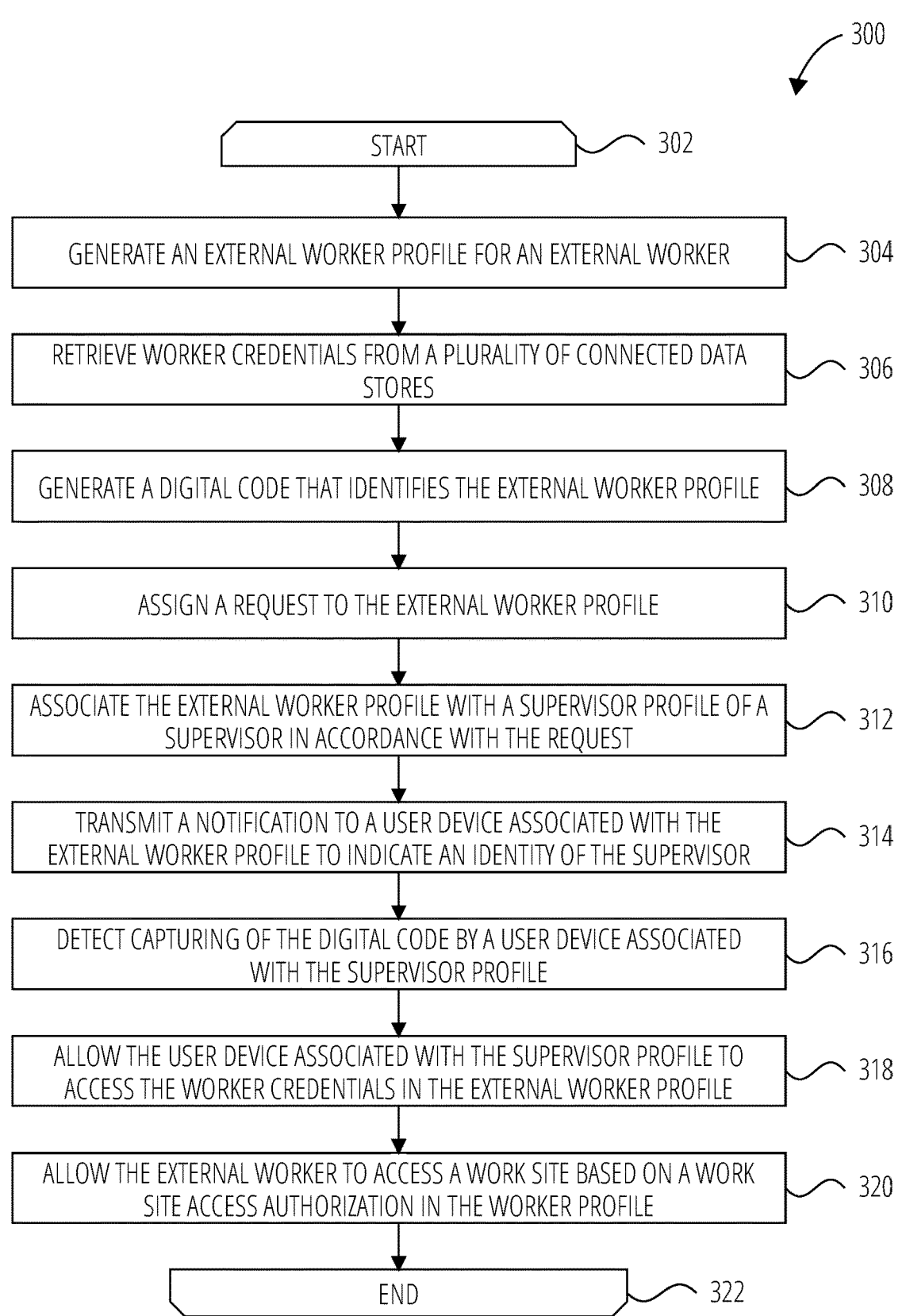

300

START 302

GENERATE AN EXTERNAL WORKER PROFILE FOR AN EXTERNAL WORKER 304

RETRIEVE WORKER CREDENTIALS FROM A PLURALITY OF CONNECTED DATA STORES 306

GENERATE A DIGITAL CODE THAT IDENTIFIES THE EXTERNAL WORKER PROFILE 308

ASSIGN A REQUEST TO THE EXTERNAL WORKER PROFILE 310

ASSOCIATE THE EXTERNAL WORKER PROFILE WITH A SUPERVISOR PROFILE OF A SUPERVISOR IN ACCORDANCE WITH THE REQUEST 312

TRANSMIT A NOTIFICATION TO A USER DEVICE ASSOCIATED WITH THE EXTERNAL WORKER PROFILE TO INDICATE AN IDENTITY OF THE SUPERVISOR 314

DETECT CAPTURING OF THE DIGITAL CODE BY A USER DEVICE ASSOCIATED WITH THE SUPERVISOR PROFILE 316

ALLOW THE USER DEVICE ASSOCIATED WITH THE SUPERVISOR PROFILE TO ACCESS THE WORKER CREDENTIALS IN THE EXTERNAL WORKER PROFILE 318

ALLOW THE EXTERNAL WORKER TO ACCESS A WORK SITE BASED ON A WORK SITE ACCESS AUTHORIZATION IN THE WORKER PROFILE 320

END 322

FIG. 3

ENCODED IDENTIFIERS FOR CREDENTIAL ACCESS AND DISTRIBUTION

TECHNICAL FIELD

The subject matter disclosed herein generally relates to systems and methods for managing and providing access to workforce data. More specifically, but not exclusively, the subject matter relates to the use of encoded identifiers for credential access and distribution.

BACKGROUND

Many businesses utilize the services of external workers, such as contractors. A business may need to verify and manage a variety of worker credentials of an external worker. For example, in a mining or construction environment, the business may need to ensure that the external worker is properly identified, meets the requirements for working on an assignment (e.g., the external worker has a valid certification and has completed a prerequisite safety training course), is authorized to access a work site, and is able to locate and communicate with a supervisor.

Obtaining, distributing, and managing the worker credentials of external workers may be technically challenging, involving various disconnected systems or manual processes. Worker credentials may be fragmented and difficult to access. For example, once a supervisor has located a new external worker at a work site, it may be challenging for the supervisor to verify their worker credentials in an efficient manner. External workers often assist a business on a temporary basis, and the transient nature of their services may amplify these technical challenges. For example, a contractor may work for a client for only a few weeks or months before moving to a next client. This may make it infeasible or technically impractical to provision a traditional enterprise profile and access to a contractor, and may also result in the contractor having to repeat various onboarding steps for each new assignment or work site.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

FIG. 3 is a flowchart illustrating operations of a method suitable for obtaining worker credentials and providing controlled access to the worker credentials, according to some examples.

DETAILED DESCRIPTION

Figure 1:
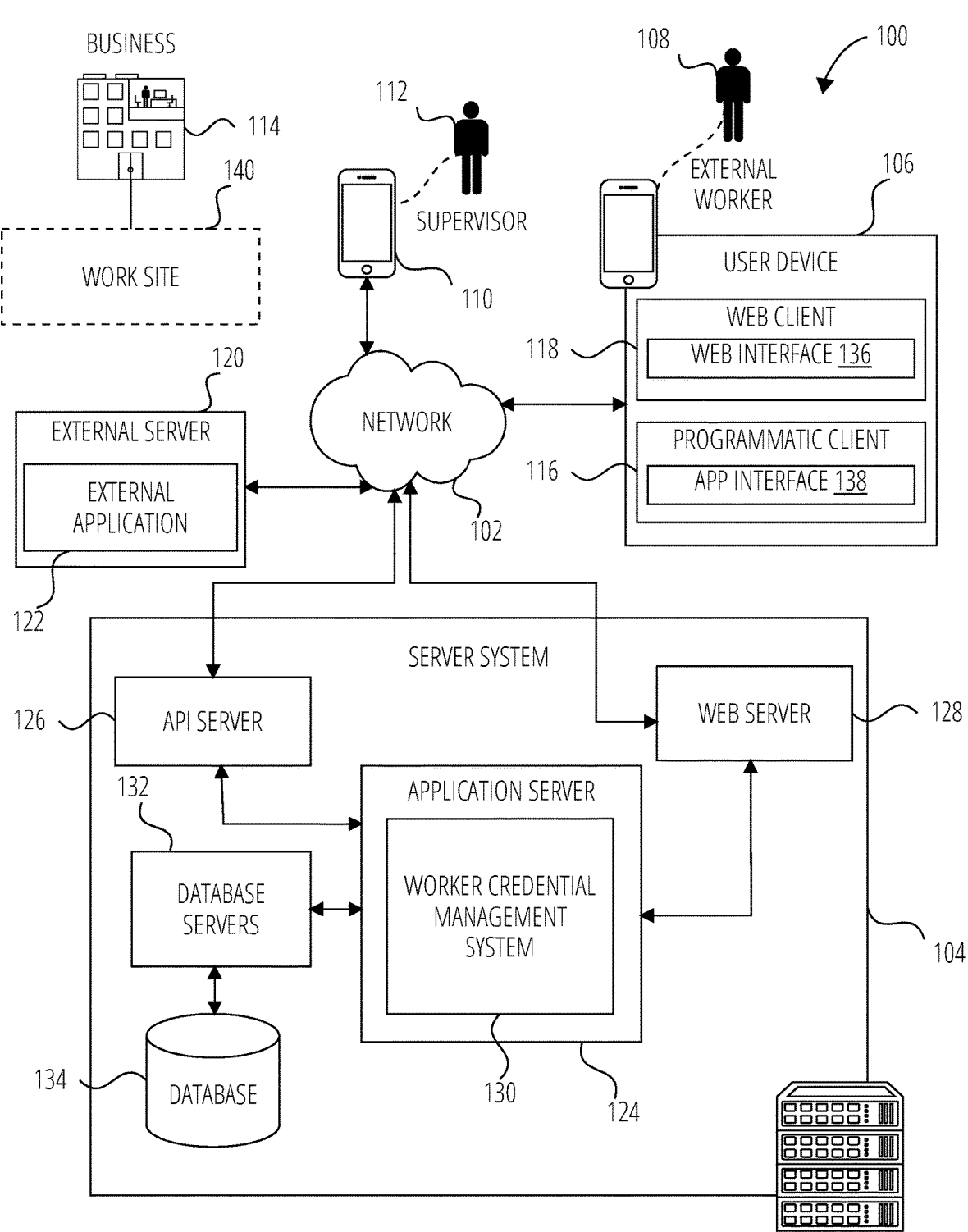
FIG. 1 is a diagrammatic representation of a network environment that includes a worker credential management system, according to some examples.

Obtaining, distributing, or managing worker credentials may present technical challenges, particularly where external workers are involved. The term "external worker," as used herein, refers to a contractor, vendor, temporary worker, or other human resource who is not a regular or full-time employee of a business or organization, but is assigned one or more work orders by the business or organization. An external worker may, for example, be self-employed, employed by a partner business or organization, or employed via an independent agent.

The term "work order," as used herein, refers to a job, task, project, or other assignment that is assigned to a worker, such as an external worker. A work order may provide details about the nature, timing, location, requirements, or other parameters associated with the work to be performed by the assigned worker. The term "work order" thus not only refers to the job, task, project, or assignment at hand, but also to other information or data relating to the work to be performed. A work order may be generated by a supervisor, manager, administrator, or automated system on behalf of a business or organization. In some examples, a work order is assigned to a worker profile. In other words, the work order may be allocated to a particular worker who has a worker profile. The work order may identify the worker profile and a supervisor profile of a supervisor, as described below.

The term "worker credentials," as used herein, refers to identifying information, qualifications, certifications, clearances, access rights, achievements, tasks, work history, safety information, medical information, memberships, compliance data, or other records or data that may validate or provide information relating to the identity, background, qualifications, abilities, or record of a worker. For example, worker credentials may include one or more of:

worker identity credentials, such as name, contact information, emergency contact details, photograph, biometrics, worker identifier (e.g., contractor code), or profile identifier;

worker onboarding credentials, such as orientation checklists, onboarding task completion records, company policy details, non-disclosure agreements, medical details (e.g., fitness or allergies), accommodation details, or travel details;

worker task credentials, such as assigned work orders, tasks, job titles, roles, responsibilities, or activity statuses;

worker compliance credentials, such as compliance with one or more prerequisites for an operation (e.g., permits, licenses, completed training courses, certifications, or medical tests needed to perform a work order);

worker training credentials, such as completed courses, grades, certifications, learning activities, reference materials, or external training links;

worker access credentials, such as badges, clearances, access cards, or access rights (e.g., work site access authorizations).

In projects involving external workers, worker credentials may be stored in fragmented or disconnected data sources, making it difficult to obtain a unified view of certain worker credentials (e.g., compliance status) of an external worker. For example, in some cases, a human resource system tracks basic external worker information, a separate vendor management platform tracks project details or billing, a separate learning management system tracks training and certifications, and a separate access control system stores and manages clearances or site permissions.

As a result, it may be challenging to enable efficient, yet controlled, sharing of worker credentials with supervisors. The term "supervisor," as used herein, refers to an employee or other individual associated with a business or organization who is directly or indirectly responsible for managing work orders or external workers assigned to those work orders. For example, a supervisor may be an administrator, business unit manager, or work site manager who is responsible (directly or indirectly) for reviewing worker credentials (e.g., to ensure that external workers comply with safety requirements), granting access to work sites, ensuring that they have the resources they need to complete their tasks, monitoring progress, or supervising their actual performance.

Examples described herein may address or alleviate technical challenges by providing a centralized architecture for managing and distributing worker credentials. Examples described herein may provide supervisors with improved visibility into worker credentials.

In some examples, a system or technique as described herein may provide a single, mobile-accessible interface to complete most or all aspects of an external worker's "work cycle" for a given client organization (e.g., a mining company), from evidencing certifications to undertaking training, as well as understanding site-specific developments in-real time. For supervisors, a system or technique as described herein may enable them to view respective work or service orders and assigned workers (and their worker credentials) to identify any outstanding activities which may impact the safe delivery of work.

In some examples, worker data items are securely aggregated (e.g., from diverse data sources) and shared with authorized individuals using encoded identifiers. A supervisor may be provided with real-time data access, compliance tracking and workflows (e.g., while contractors are physically on premises). Improved compliance tracking may reduce or mitigate safety risks, particularly in industries such as the mining and oil and gas industries, which typically operate with a high percentage of their labor force as contractors.

In some examples, a software application in the form of a mobile client application provides a "digital passport" for use by a worker, such as an external worker, to facilitate onboarding, information access, compliance verification, access control, or coordination between the worker and a supervisor. The software application may alleviate the fragmentation issue described above and allow for more efficient worker credential monitoring or management.

A method may include assigning a request to a first profile identified by a first identifier in the request. The first profile may be a worker profile that includes worker credentials. An association between the first profile and a second profile identified by a second identifier in the request may be stored (e.g., in a database). The second profile may be a supervisor profile. In some examples, the request comprises a work order. In some examples, the request identifies the work order (e.g., includes an identifier of the work order). Assigning the request to the first profile may comprise assigning the work order to the first profile or otherwise linking the work order to the first profile.

The term "profile," as used herein in the context of a worker or a supervisor, refers to a digital representation that includes one or more credentials or other details associated with an individual. For example, in the case of a worker profile, the profile may store information such as a worker name, a unique identifier (e.g., code), qualifications, certifications, organization affiliations, training status, or other worker credentials. The worker profile may also include details of work requests, work orders, or other operations or activities. In the case of a supervisor profile, the profile may store information that can be used to identify the supervisor, such as a supervisor name and photograph, as well as other information relating to the supervisor. A profile may be identified by a unique identifier.

The method may include encoding the first identifier (e.g., a unique number associated with the first profile) into a digital code that is presentable by a first device associated with the first profile. A second device associated with the second profile may capture the digital code (e.g., while it is displayed on the first device). For example, the second device may capture the digital code and decode the digital code to obtain the first identifier. In some cases, only the second device is able to decode the digital code and devices associated with profiles that are not linked to the first profile are unable to decode the digital code. In some examples, the digital code is decoded at a server to obtain the first identifier.

In response to detecting the capturing of the digital code by the second device, the second device or server may identify the association between the first profile and the second profile, and then transmit, based on the association between the first profile and the second profile, at least a subset of the worker credentials to the second device. In this way, worker credentials from various sources may be shared with a supervisor associated with the second profile in a controlled manner.

In some examples, a server identifies a prerequisite for commencement of the work order assigned to the first profile. Based on the worker credentials in the first profile, the server may determine that the prerequisite is not met. In response to determining that the prerequisite is not met, the server may identify an outstanding activity corresponding to the prerequisite and assign the outstanding activity to the first profile. A notification indicative of the outstanding activity may be transmitted (e.g., to the first device or the second device).

The digital code may, for example, be a Quick Response (QR) code, other barcode, or another visually represented code. The term "digital code" may refer to any encoded representation in a format that can be generated electronically and read using appropriate devices. The digital code may contain information that can be decoded to extract the embedded data.

In some examples, the digital code is presentable by the first device via a first instance of a client application executing at the first device, and the digital code is captured by the second device via a second instance of the client application executing at the second device. The client application may be a mobile application that provides, in the case of the first device, "digital passport" functionality.

In some examples, a subset of worker credentials is identified based on an offline availability rule associated with the first profile. The subset of worker credentials is then caused to be stored locally on the first device. For example, while a full set of worker credentials may be stored in cloud-based storage accessible via a server, certain worker credentials (e.g., worker identity credentials) may be stored locally at the first device. The offline availability rule may be any rule or set of criteria that determines what data or capabilities should be available on a user device even in offline mode (e.g., when the device does not have network connectivity). In this way, reliability and availability of critical data may be enhanced.

The worker credentials may include worker access credentials. The work order may include work site data. The method may include generating, based on the work site data, the worker access credentials to include a work site access authorization. In some examples, the work site access authorization is included in the subset of the worker credentials transmitted to the second device.

The term "work site," as used herein, refers to any physical location, facility, area, property, building, or premises where a work order (or part thereof) is to be executed by an assigned worker. The work site may have associated access restrictions, safety protocols, on-site equipment, or other attributes that impact the work execution. Details of the work site may be incorporated into the work order. The term "work site access authorization," as used herein, refers to any approval, credential or set of credentials that allows a worker to gain permissible entry into a designated work site or area within the work site. The work site access authorization may represent access rights granted to a worker profile to enter and operate at a specific work site to execute a work order. The work site access authorization may reflect permissions, security clearances, training completions, or other prerequisites needed to begin working.

As mentioned, worker credentials may be integrated or aggregated from multiple sources into a centralized profile. In some examples, the method includes accessing a plurality of cloud-based credential stores and using the first identifier (e.g., a name or code associated with a worker) to retrieve at least some of the worker credentials from the plurality of cloud-based credential stores. The term "credential store," as used herein, refers to a system, database, or repository that contains credentials or other records associated with worker profiles. The system may retrieve or verify credentials from multiple stores within an organization or external (e.g., third-party) credential stores. Examples of credential stores include identity management systems, access management systems, task management systems, learning management systems, human resources databases, or external certification repositories.

In some examples, the association between the first profile (e.g., an external worker profile) and the second profile (e.g., a supervisor profile) is stored in a database. Where the second profile is a supervisor profile, the database may store associations between the supervisor profile and multiple other worker profiles. This may allow a supervisor to manage and access the profiles of multiple external workers in a convenient manner.

As mentioned, the supervisor profile may include supervisor credentials that can be used to identify or locate a supervisor. The method may include, in response to assigning of the request to the first profile, transmitting at least a subset of the supervisor credentials to the first device. This may allow a worker (e.g., a contractor) to locate an assigned supervisor more easily at a work site.

A mobile software application as described herein may provide multiple functionalities, such as access to profiles, assigned tasks, outstanding activities, and learning requirements. The mobile software application may be used to receive notifications and communicate with supervisors. Further, the mobile software application may generate or display the digital code that can be captured by a supervisor to obtain access to a worker profile.

The mobile software application may provide a "single source of truth" for worker credentials, allowing for improved external worker onboarding, work coordination, safety compliance, or overall user experience for external workers and supervisors. Tasks may be assigned to a worker profile, and the mobile software application may be used to track task statuses. In some examples, training courses or learning modules may be assigned to a worker profile, and the mobile software application may be used to complete, track, or manage such training courses or learning modules.

Worker credentials in a worker profile may be usable across various projects, locations, work sites, and supervisors, without having to recapture or reenter the worker credentials for each new project, location, work site, or supervisor. Examples described herein may reduce repeated or manual verification of prerequisites, activities, or other requirements, which can be cumbersome and error-prone. Furthermore, data fragmentation and difficulties in credential sharing may be addressed by providing a digital code that can be captured and decoded to retrieve appropriate credentials for a worker based on profile associations.

Examples described herein may improve or automate compliance tracking when dealing with external workers. For example, the method may include automatically identifying outstanding prerequisites for work orders, assigning activities to worker profiles, and sending notifications about unmet prerequisites.

When the effects in this disclosure are considered in aggregate, one or more of the methodologies described herein may obviate a need for certain efforts or resources that otherwise would be involved in obtaining, managing, or distributing worker credentials. Computing resources utilized by systems, databases, or networks may be more efficiently utilized or reduced, e.g., as a result of obviating the need to recapture or reenter worker credentials. Examples of such computing resources may include processor cycles, network traffic, memory usage, graphics processing unit (GPU) resources, data storage capacity, power consumption, and cooling capacity. Furthermore, examples described herein may improve the security of a credential system by providing controlled access to data through encoded identifiers.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user. In the case of FIG. 1, the user of the user device 106 is an external worker 108. While the external worker 108 is referenced herein to describe certain examples, it will be appreciated that similar techniques or systems may be utilized by other types of workers, such as permanent employees.

A web client 118 (e.g., a browser) or a programmatic client 116 (e.g., an "app") may be hosted and executed on the user device 106. FIG. 1 also shows a user device 110 of a supervisor 112. The user device 110 may be similar to the user device 106. In some examples, the user device 106 and the user device 110 are mobile devices (e.g., smartphones or tablets) that allow the external worker 108 and the supervisor 112 to utilize certain functionalities while working at a work site.

An Application Program Interface (API) server 126 and a web server 128 provide respective programmatic and web interfaces to components of the server system 104. A specific application server 124 hosts a worker credential management system 130, which includes components, modules, or applications.

The user device 106 and the user device 110 can communicate with the application server 124, e.g., via the web interface supported by the web server 128 or via the programmatic interface provided by the API server 126. It will be appreciated that, although only a single external worker 108 and a single supervisor 112 are shown in FIG. 1, a plurality of external workers and a plurality of supervisors may utilize user devices to communicate with the server system 104 in some examples. Further, while certain functions may be described herein as being performed at the user device 106/110 (e.g., web client 118 or programmatic client 116) or the server system 104, the location of certain functionality either within a user device or a server system may be a design choice.

The application server 124 is communicatively coupled to database servers 132, facilitating access to one or more information storage repository, e.g., a database 134. In some examples, the database 134 includes storage devices that store information to be processed by the worker credential management system 130, e.g., data forming part of worker profiles or supervisor profiles.

The application server 124 accesses application data (e.g., application data stored by the database servers 132) to provide one or more applications or software tools to the user device 106 via a web interface 136 or an app interface 138. As described further below according to examples and with specific reference to FIGS. 2-6, the application server 124, using the worker credential management system 130, may provide a software application in the form of a worker credential management application. The worker credential management application may execute on the user device 106 and the user device 110 as respective instances of a client application (e.g., the programmatic client 116).

The worker credential management system 130 facilitates the management of external workers (e.g., the external worker 108), including their worker credentials, and coordination with internal supervisors (e.g., the supervisor 112). The worker credential management system 130 may handle creating and managing external worker profiles, assignment of work assignments to external worker profiles, and retrieval of worker credentials from various sources.

The worker credential management system 130 may further cause generation of unique digital codes, such as QR codes, representing each external worker's profile. The worker credential management system 130 may enable, via the worker credential management application, the sharing of worker credentials based on the capturing of digital codes and profile associations, as described in greater detail elsewhere.

The worker credential management system 130 may be configured to track compliance with job prerequisites and transmit notifications or reminders about outstanding activities. The worker credential management system 130 may enable the external worker 108 to use the worker credential management application as a "digital passport" at a work site 140 of a business 114 (e.g., a business that employs the supervisor 112).

In some examples, the "digital passport" provided by the worker credential management application can conveniently be used across multiple work sites or locations, or in interactions with multiple different clients, without the external worker 108 having to reenter or recapture worker profile data (e.g., worker credentials). Accordingly, the worker credential management system 130 may be communicatively coupled to systems or devices associated with multiple different businesses, companies, or organizations.

The worker credential management application may be deployed as a cloud platform-as-a-service (PaaS) offering. The PaaS may provide a managed environment for hosting the worker credential management application, connecting it to various data sources, enabling notifications, managing user authentication, or handling other functionalities. In some examples, the client-side portion of the work worker credential management application may include thin native shells for target mobile platforms, such as iOS™ and Android™. These client applications (e.g., as installed on the user device 106 or the user device 110) may act as secure windows into certain application logic executing on a cloud platform (e.g., at the server system 104).

The client application may have offline capabilities. For example, the client application may leverage mobile platform APIs for local storage and caching of basic profile data, work orders, and other artifacts to be accessed without continuous connectivity (e.g., based on an offline availability rule).

The worker credential management system 130 may provide one or more notifications, interfaces, or dashboards via a GUI on the user device 106 or the user device 110. For example, on the user device 106 of the external worker 108, the worker credential management application may provide details of assigned work orders and outstanding activities, and allow the external worker 108 to display the digital code that identifies the external worker 108 on a display of the user device 106.

As is described in greater detail with reference to FIG. 2, the worker credential management system 130 may integrate with multiple other systems, such as systems of record that provide worker credentials. In some examples, the application server 124 is part of a cloud-based platform provided that allows an organization or business (e.g., the business 114) to utilize the worker credential management system 130 as well as one or more other solutions (see the example data stores shown in FIG. 2, and described below).

The external worker 108 or the supervisor 112 may thus be a customer or client of a software provider responsible for the worker credential management system 130. The external worker 108 or the supervisor 112 may hold a user account with the software provider. To access the worker credential management system 130, a user may create an account (or access an existing account) with an entity associated with the server system 104, such as the software provider mentioned above. The user may use account credentials to access the web interface 136 or the app interface 138.

One or more of the application server 124, the database servers 132, the API server 126, the web server 128, or the worker credential management system 130 may each be implemented in a computer system, in whole or in part, as described below with respect to FIG. 8. In some examples, external applications (which may be third-party applications or applications provided by the software provider of the server system 104), such as an external application 122 executing on an external server 120, can communicate with the application server 124 via the programmatic interface provided by the API server 126. For example, a third-party application may support one or more features or functions on a website or platform hosted by a third party, or may perform certain methodologies and provide input or output information to the application server 124 for further processing or publication.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
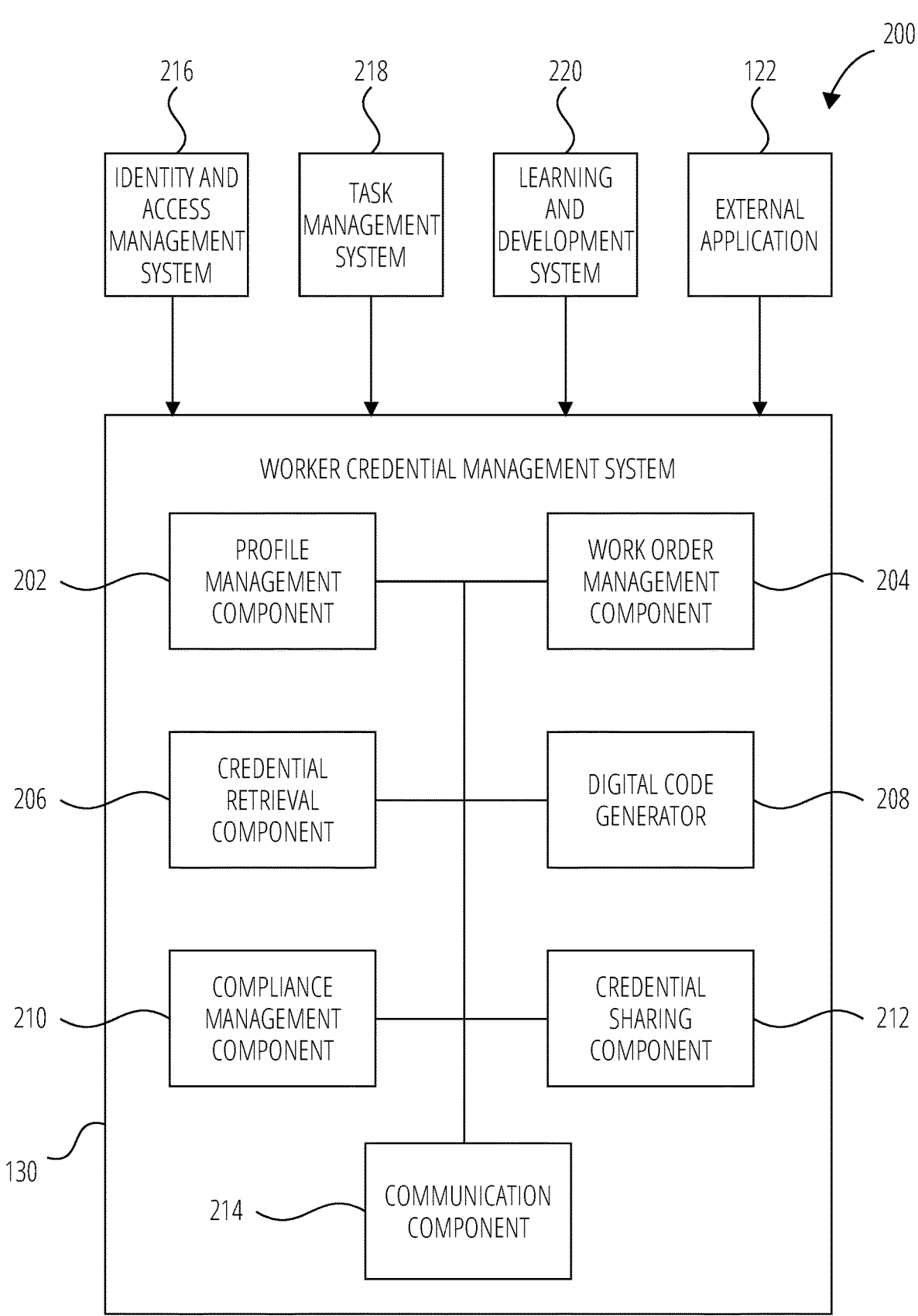
FIG. 2 is a block diagram of certain components of a worker credential management system and other systems that may communicate with the worker credential management system, according to some examples.

FIG. 2 is a block diagram illustrating certain components of the worker credential management system 130 of FIG. 1, according to some examples. The worker credential management system 130 is shown to include a profile management component 202, a work order management component 204, a credential retrieval component 206, a digital code generator 208, a compliance management component 210, a credential sharing component 212, and a communication component 214. FIG. 2 also shows a plurality of other systems that may communicate with the worker credential management system 130: an identity and access management system 216, a task management system 218, a learning and development system 220, and the external application 122 of FIG. 1. These components and systems are examples, and it will be appreciated that other components or systems may be deployed or utilized.

The profile management component 202 is responsible for creating, updating, and managing profiles in the worker credential management system 130. Profiles may include worker profiles (e.g., external worker profiles) or supervisor profiles. The profile management component 202 may store credentials, generate a unique identifier for each profile, interface with other components to keep profiles updated, and handle other profile-related data operations.

In some examples, the profile management component 202 causes some worker credentials to be stored locally at a user device (e.g., the user device 106) based on an offline availability rule. This may, for instance, allow a supervisor to view the basic profile and work order information of an external worker at a work site, even when the user device of the external worker is offline. Data may be synchronized with server-side data once connectivity is restored.

The work order management component 204 may handle the creation, assignment, tracking, or management of work orders. The work order management component 204 may associate work orders with respective external worker profiles, monitor work order status, or interface with other systems (e.g., the task management system 218) regarding work order details. In some examples, the work order management component 204 associates a worker profile with a supervisor profile to indicate that the relevant supervisor is assigned as the supervisor of the relevant worker for a particular work order. This may allow the supervisor to access worker credentials of the worker, as described further below.

The credential retrieval component 206 retrieves worker credentials from one or more sources or data stores, which may include internal or external data stores. For example, in the diagram 200 of FIG. 2, the credential retrieval component 206 may retrieve worker credentials from the identity and access management system 216, the task management system 218, the learning and development system 220, or the external application 122.

The identity and access management system 216, the task management system 218, and the learning and development system 220 are internal data stores as they are provided by the same service provider as the service provider that provides the worker credential management system 130, while the external application 122 is an external data store that is provided by a third party. The credential retrieval component 206 may use APIs to communicate with these data stores.

The digital code generator 208 may be used to generate unique digital codes, such as QR codes, representing or identifying respective worker profiles. For example, the digital code generator 208 may convert a profile identifier of a worker profile into a scannable digital code that can be displayed on the user device 106 of the external worker 108 and decoded by the user device 110 of the supervisor 112.

In some examples, the digital code generator 208 is provided as a client-side module that allows for local code generation, while in other examples the functionality of the digital code generator 208 is provided at the server system 104, with digital codes being transmitted to user devices. The user device 110 may utilize a built-in camera and code scanning capabilities to capture or decode a digital code of a worker. In the case of a QR code, for example, the QR code may be captured using a digital camera sensor that captures a digital image of or including the QR code. Software executing on the user device 110 analyzes the digital image to detect and isolate the QR code (e.g., using computer vision techniques, such as thresholding or contour detection). Once isolated, the QR code may go through error correction (e.g., Reed-Solomon error correction). The binary data encoded in the QR code may be decoded using a standardized QR code specification to obtain the identifier. The worker credential management application may utilize the decoded identifier to retrieve worker credentials. In some examples, the digital code may be decoded on the server side.

The compliance management component 210 may track compliance requirements and prerequisites associated with work orders. For example, the compliance management component 210 may check the worker credentials in a worker profile against predetermined requirements associated with commencement of a work order (e.g., safety requirements, permit requirements, or training course requirements), flag any outstanding requirements, and trigger notifications regarding non-compliance.

As mentioned, the worker credential management application may utilize an identifier of a worker to retrieve worker credentials from the relevant worker profile. The credential sharing component 212 facilitates sharing of worker credentials between different devices based on configured profile associations and permissions. For example, based on a stored association between a specific external worker profile and a specific supervisor profile with respect to a work order, the credential sharing component 212 may enable a user device of the supervisor associated with the supervisor profile to view certain worker credentials of the external worker associated with the external worker profile after the supervisor has used their user device to capture the digital code displayed on the user device of the external worker.

The credential sharing component 212 may block or deny access to worker credentials if the appropriate association between worker and supervisor profiles is not detected. For example, if a user of the worker credential management application, who is not the supervisor of a particular external worker, scans the digital code presented by that external worker, the credential sharing component 212 may detect that the user does not have permission to view or access the external worker's profile, and block or deny such access.

The communication component 214 may be responsible for generating and sending notifications to worker and supervisor devices (e.g., the user device 106 and the user device 110) regarding various aspects handled by the worker credential management system 130, such as work order assignments, outstanding activities, non-compliance alerts, or general broadcasts. In some examples, the communication component 214 enables messaging or calling functionality, within the context of the worker credential management application, between workers and assigned supervisors. For example, the communication component 214 may provide a "chat" functionality that allows a worker to exchange messages with their assigned supervisor.

Turning now to the other systems that may communicate with the worker credential management system 130, the identity and access management system 216 may provide worker identity credentials or worker access credentials. For example, the identity and access management system 216 may provide functions such as single sign-on, secure access, and user authentication, and provide relevant credentials to the worker credential management system 130. The credential retrieval component 206 may interface with the identity and access management system 216 to retrieve worker identity details (e.g., by providing a profile identifier that identifies worker records in the identity and access management system 216).

In some examples, a federated identity model is implemented to enable single sign-on and centralized authentication for the worker credential management application across different user types. This architecture may delegate authentication to trusted identity providers rather than having the worker credential management application manage credentials directly. Selected user attributes from such an external provider may be mapped into a worker profile or supervisor profile by the profile management component 202.

The task management system 218 may provide capabilities to assign, monitor, or track work orders and, in some examples, individual tasks associated with work orders. The credential retrieval component 206 may interface with the task management system 218 to obtain worker task credentials (e.g., by providing a profile identifier that identifies worker records in the task management system 218).

The learning and development system 220 may manage or track training courses, learning modules, certifications, or other learning items for workers. The credential retrieval component 206 may retrieve worker training credentials, such as completed courses, grades, and certifications, from the learning and development system 220 (e.g., by providing a profile identifier that identifies worker records in the learning and development system 220).

In the example of FIG. 2, the external application 122 represents a third-party or external system that provides additional worker credentials not available in the internally connected systems (e.g., the identity and access management system 216, the task management system 218, or the learning and development system 220). The credential retrieval component 206 may interface with various external applications 122 to collect supplemental credential data from outside sources. For example, the credential retrieval component 206 may collect worker onboarding credentials from an external service provider or agent that is responsible for onboarding contractors.

In some examples, in addition (or as an alternative) to retrieval of worker credentials by the credential retrieval component 206, a user may input at least some worker credentials directly to the worker credential management system 130. For example, the user may complete certain onboarding steps directly on the worker credential management application and such worker credentials may then be stored directly into the worker profile by the profile management component 202. As another example, the user may upload permits or certifications directly to the worker credential management system 130.

Similarly, a third party may input certain worker credentials into the worker credential management system 130. For example, an agent responsible for onboarding a contractor may prepopulate the worker profile of the contractor with certain information.

Based on compliance rules, work order prerequisites, or task prerequisites, the compliance management component 210 of the worker credential management system 130 may analyze the worker credentials retrieved or obtained as described above, and generate worker compliance credentials that indicate whether a worker has any outstanding activities, lacks qualifications, requires further training, or the like.

For example, the compliance management component 210 may detect that additional training is required before a worker can commence with a work order. The worker credential management system 130 may transmit a notification to the worker and the assigned supervisor. The compliance management component 210 may also allow the worker to use the user device 106 and the worker credential management application directly to complete the training. For example, the worker credential management application may enable the worker to access the connected learning and development system 220 to complete the required training, after which the worker credentials of the worker are updated by the profile management component 202.

In some examples, at least some of the components shown in FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

FIG. 3 is a flowchart illustrating operations of a method 300 suitable for obtaining worker credentials and providing controlled access to the worker credentials, according to some examples. By way of example and not limitation, aspects of the method 300 may be performed by the components, devices, systems, network, or databases shown in FIG. 1 and FIG. 2.

In the method 300 of FIG. 3, a request is assigned to the external worker 108 of FIG. 1. As mentioned, the request may include or identify a work order. The work order identifies task information (e.g., details of a project on which the external worker will be working as a contractor) and also identifies the supervisor 112 assigned to the external worker. For example, the work order may include a first identifier of the external worker profile and a second identifier of the supervisor profile.

The method 300 commences at opening loop element 302 and proceeds to operation 304, where the worker credential management system 130 generates an external worker profile for the external worker 108. The external worker 108 may use the worker credential management application to add certain worker credentials, such as worker identity credentials. The business 114 (or another entity) may also have prepopulated the external worker profile with certain information.

At operation 306, the worker credential management system 130 automatically retrieves further worker credentials from a plurality of data stores, such as those shown in FIG. 2. For example, the worker credential management system 130 may retrieve worker training credentials and add them to the external worker profile.

In some cases, as part of an initial onboarding process, the external worker 108 may be prompted to complete training (e.g., an online learning module) via the worker credential management application. Once the external worker 108 has completed the training, the external worker profile is updated with the relevant worker training credentials.

The method 300 proceeds to operation 308, where the worker credential management system 130 generates a digital code that identifies the external worker profile. The external worker 108 can use the worker credential management application as a "digital passport" by displaying the digital code, as described further below.

At operation 310, the request that includes or identifies the work order is assigned to the external worker 108, and the worker credential management system 130 adds the work order to the worker profile. For example, the worker credential management system 130 may generate a link between the worker profile and a work order created in the task management system 218. As mentioned, the work order identifies the supervisor 112.

The worker credential management system 130 receives an identifier of the supervisor profile of the supervisor 112 and, at operation 312, stores an association between the external worker profile and the supervisor profile (e.g., in the database 134). This association indicates that the supervisor profile is permitted to access at least a subset of worker credentials in the external worker profile.

In some examples, the external worker profile is updated to include an identifier of the supervisor (e.g., a supervisor account identifier) to indicate that the supervisor is permitted to access the external worker profile. In some examples, the supervisor profile is updated to include an identifier of the external worker (e.g., a worker account identifier) to indicate that the supervisor is permitted to access the external worker profile.

At operation 314, the worker credential management system 130 transmits a notification to the user device 106 of the external worker 108 to indicate an identity of the supervisor. For example, the user device 106 may receive a message via the worker credential management application, indicating that the new work order has been assigned and that the external worker 108 should report to the supervisor 112 at the work site, along with details of the supervisor 112 (e.g., a name and a photograph). At this stage, the worker credential management system 130 may also enable "chat" or calling functionality to allow the external worker 108 and the supervisor 112 to start communicating (e.g., using the communication component 214 of FIG. 2). For example, the supervisor 112 may transmit a message via the "chat" functionality to assist the external worker 108 in finding the location of the work site.

The external worker 108 then arrives at the work site and presents the digital code on the user device 106. The supervisor 112 uses the user device 110 to capture the digital code. The digital code is decoded to obtain an identifier of the external worker profile and the identifier is received at the worker credential management system 130. The worker credential management system 130 thus detects capturing of the digital code by the user device 110 at operation 316. In response, and based on the existing association between the two profiles (or based on another flag that indicates the relevant permission), the worker credential management system 130 allows the user device 110 to access one or more worker credentials of the external worker 108 (operation 318).

In some examples, once the supervisor 112 has captured the digital code, the supervisor 112 is presented, on the user device 110, with basic profile information and worker onboarding credentials for the external worker 108, indicating whether the external worker 108 has been fully onboarded and whether the work may commence. For example, a message may indicate that the external worker 108 must first complete additional training via the worker credential management application before they will be permitted to start working on a project. This may allow the supervisor 112 to easily assist the external worker 108 in understanding what needs to be completed, while also reducing computing requirements associated with an onboarding or compliance process, as the supervisor 112 can consult a single digital source to check for outstanding requirements.

The worker credential management system 130 may, for example, transmit worker identity credentials, worker training credentials, and worker compliance credentials of the external worker 108 to the user device 110. In some examples, the user device 110 is enabled to fully view the external worker profile via the worker credential management application.

In this way, the worker credential management system 130 may provide quick and convenient, yet controlled and secure, access to the external worker profile, allowing the supervisor 112 to view a variety of worker credentials, in some examples. The compliance management component 210 may identify that the external worker 108 complies with one or more prerequisites for commencing with the work order and generate a work site access authorization. The work site access authorization may be a digital pass or permit that is viewable by the supervisor 112. For example, in response to the user device 110 scanning the digital code on the user device 106, the user device 110 may display the digital pass or permit of the external worker 108. In this way, the external worker 108 can conveniently gain access to the relevant work site (operation 320). In some examples, the external worker 108 may be provided with the work site access authorization irrespective of whether there are any outstanding activities or requirements.

Once the work order is in progress, the external worker 108 and the supervisor 112 may utilize various functions of the worker credential management application, as described in more detail elsewhere. For example, if the external worker 108 observes an incident that should be reported, the external worker 108 may use a reporting function of the worker credential management application to report the incident. The external worker 108 may also receive broadcasted notifications via the worker credential management application.

In some examples, the external worker 108 may utilize the worker credential management application to perform other administrative functions, such as time recording, while working on completing the work order. The worker credential management system 130 may thus integrate with a financial or billing system which receives such information originating from the external worker 108.

The supervisor 112 may use the worker credential management application to view and manage a plurality of work orders (e.g., where the supervisor 112 is working with multiple contractors). The method 300 concludes at closing loop element 322.

Figure 4:
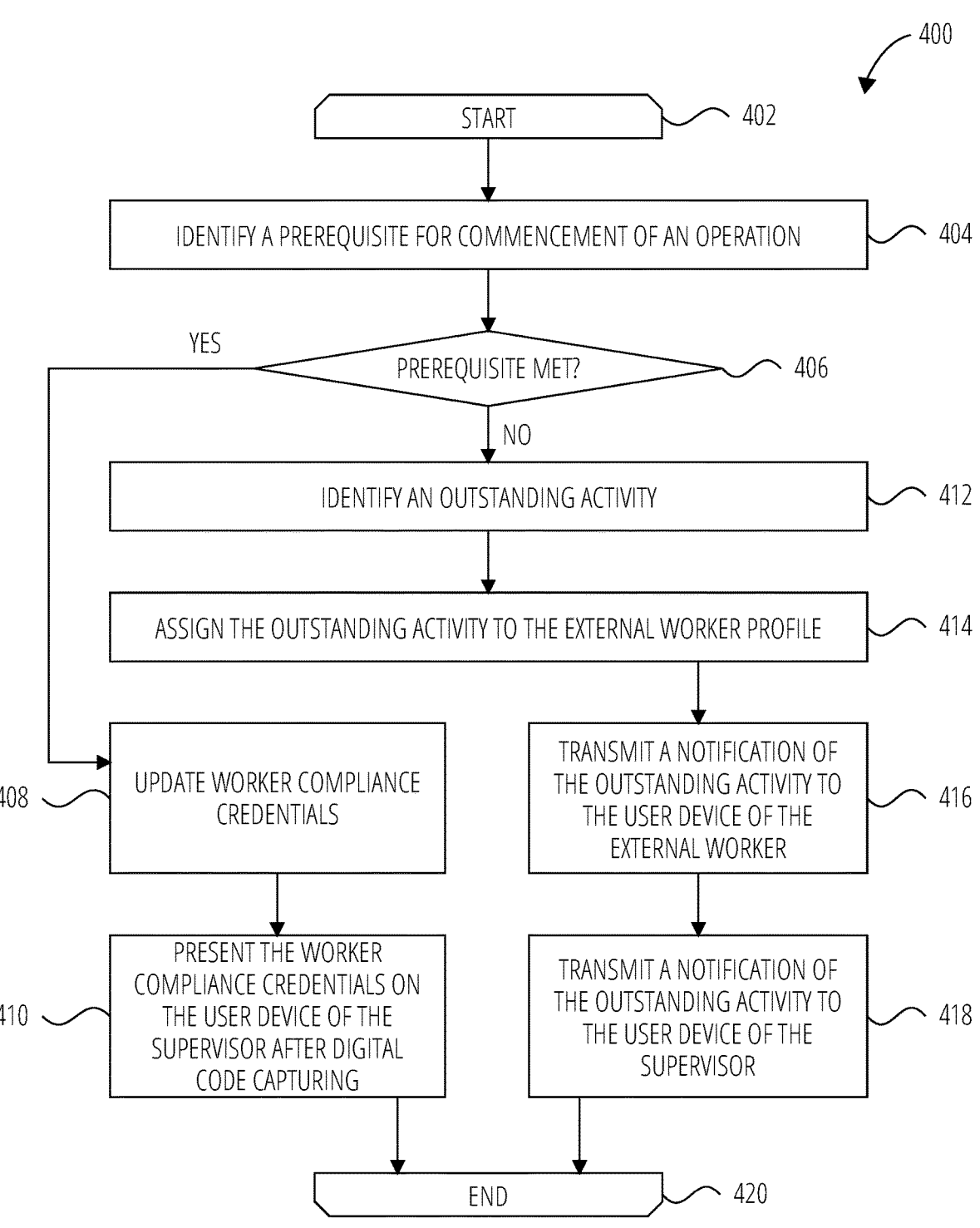
FIG. 4 is a flowchart illustrating operations of a method suitable for handling compliance with a prerequisite for commencement or completion of an operation, according to some examples.

FIG. 4 is a flowchart illustrating operations of a method suitable for handling compliance with a prerequisite for commencement or completion of an operation, according to some examples. By way of example and not limitation, aspects of the method 400 may be performed by the components, devices, systems, network, or databases shown in FIG. 1 and FIG. 2.

In the method 400 of FIG. 4, an operation in the example form of a work order is assigned to the external worker 108 of FIG. 1. As described with reference to FIG. 3, the work order identifies task information (e.g., details of a project on which the external worker will be working as a contractor) as well as the supervisor 112 assigned to the external worker.

The method 400 commences at opening loop element 402 and proceeds to operation 404, where the worker credential management system 130 identifies a prerequisite for commencement of the work order. For example, the compliance management component 210 checks a work order and identifies that the external worker 108 is required to have a valid permit of a certain type in order to enter the work site and start working. In other examples, the prerequisite may relate to continuance or completion of the work order as opposed to commencement of the work order.

If the worker credential management system 130 determines, at decision operation 406, that the prerequisite is met, the method 400 proceeds to operation 408. For example, the worker credential management system 130 determines that the external worker 108 has a valid permit, as reflected by the worker credentials in the worker credential management system 130.

At operation 408, the worker credential management system 130 updates the worker compliance credentials to indicate that the external worker 108 complies with all requirements relating to the specific work order. Once the supervisor 112 has captured the digital code of the external worker profile using the user device 110, the worker credential management system 130 then causes the worker credential management application to present the worker compliance credentials on the user device 110 of the supervisor 112 (operation 410). This allows the supervisor 112 to easily and conveniently establish that the external worker 108 meets the requirements for commencement of the work order.

On the other hand, if the worker credential management system 130 determines, at decision operation 406, that the prerequisite is not met, the worker credential management system 130 identifies an outstanding activity at operation 412. For example, the worker credential management system 130 may determine that the permit of the external worker 108, as included in the worker credentials, has expired, and must be renewed. The outstanding activity is then assigned to the external worker profile at operation 414.

At operation 416, the worker credential management system 130 transmits a notification to the user device 110 of the external worker 108 to notify the external worker 108 of the outstanding activity. The worker credential management system 130 may cause a message to be presented via the worker credential management application, indicating that the permit must be renewed before the work order can commence. A similar notification may be transmitted to the user device 110 of the supervisor 112 at operation 418.

In this way, the onboarding or compliance process associated with a work order may be facilitated or expedited. The supervisor 112 may easily and conveniently establish what actions are needed to permit commencement of the work order in a safe and secure manner, without having to refer to additional data sources. This may reduce computing resource requirements and speed up electronic onboarding or compliance processes.

In addition to ensuring that worker and supervisor safety remains a priority, a benefit to the external worker 108 may be that, in some examples, the external worker 108 need not repeat or resubmit the same worker credentials as part of a subsequent onboarding or compliance process. For example, once the external worker 108 has renewed the permit and the worker credentials have been updated, the external worker 108 may accept a subsequent work order from another company that also uses the worker credential management application. The other company may then automatically detect that the permit of the external worker 108 is valid and up to date, without having to perform additional steps in its onboarding or compliance process. This may result in reduced computing requirements, given that worker credentials can be viewed and used across multiple work orders and entities. The method 400 concludes at closing loop element 420.

The worker credential management system 130 may continuously monitor the worker credentials in the worker profile and submit alerts or notifications in response to detecting issues or potential issues. For example, the worker credential management system 130 may detect expiry of a permit or certification of an external worker, and automatically transmit notifications to user devices of the external worker and their supervisor to indicate the issue. This may also allow external workers to be informed of operational or regulatory developments.

Figure 5:
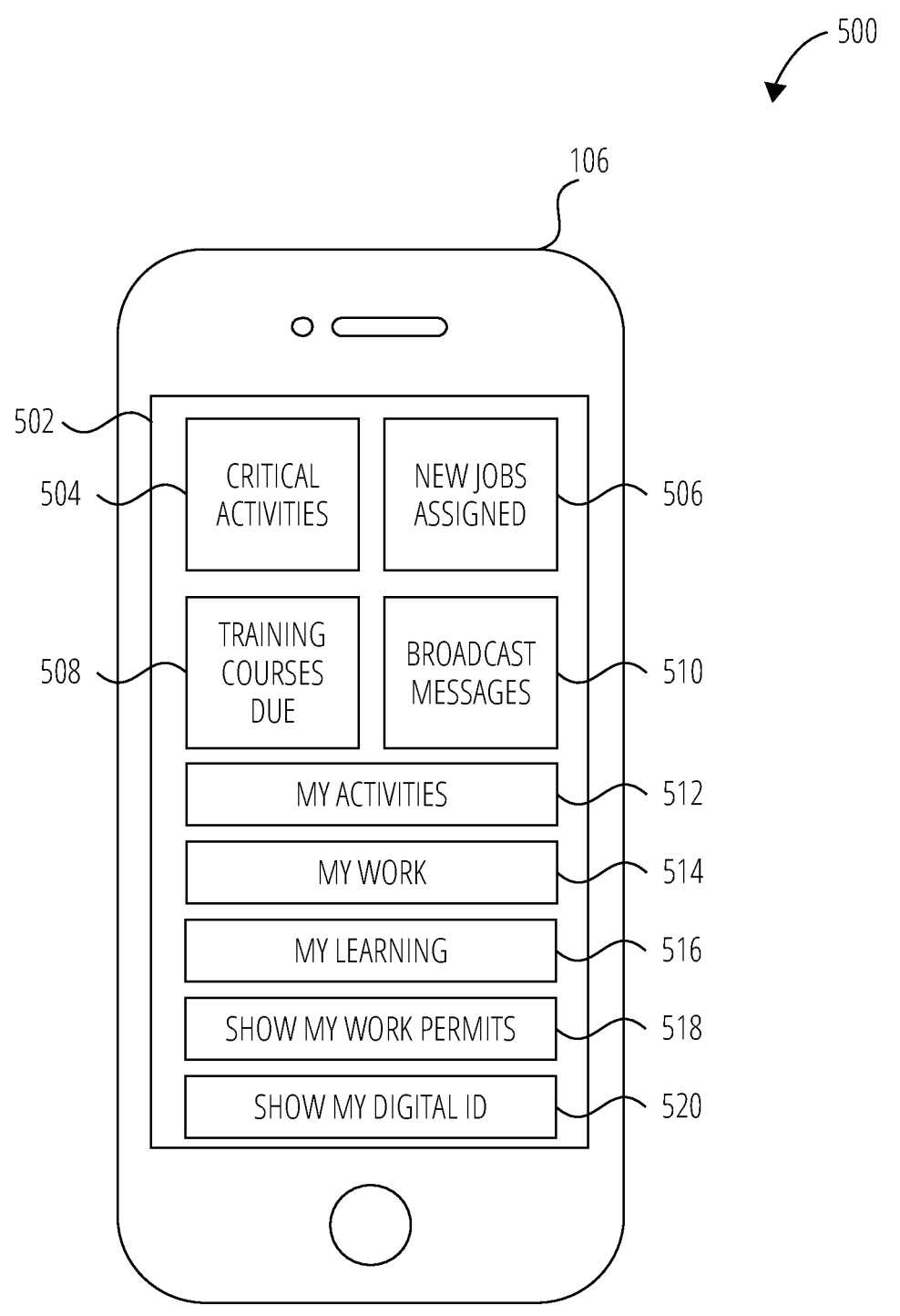
FIG. 5 is a user interface diagram that illustrates a graphical user interface (GUI) of a worker credential management application, according to some examples.

FIG. 5 is a user interface diagram 500 that illustrates a GUI 502 of a worker credential management application, according to some examples. The GUI 502 may, for example, be presented by a worker credential management application provided by the worker credential management system 130 of FIG. 1. In the example of FIG. 5, the GUI 502 is presented on the user device 106 of the external worker 108 of FIG. 1.

The GUI 502 is shown to present, to the external worker 108 accessing the worker credential management application, a critical activities section 504, a new jobs section 506, a training section 508, a broadcast messages section 510, an activities button 512, a work orders button 514, a learning button 516, a work permits button 518, and a digital identifier (ID) button 520.

The critical activities section 504 may provide a summary view of any urgent or high priority tasks assigned to the external worker 108. The critical activities section 504 may allow quick access to critical items demanding attention to ensure work execution stays on track. The new jobs section 506 may show a list of new work orders or assignments allocated to the external worker 108.

The training section 508 may display outstanding or prerequisite training courses and certifications that are pending completion by the external worker 108. The broadcast messages section 510 may present broadcast announcements sent to the external worker 108. For example, the announcements may include safety notices, policy updates, or emergency protocols.

The activities button 512 may be selected to navigate to a detailed view of all activities and tasks assigned to the worker across one or more work orders (e.g., onboarding tasks or project-related tasks). The activities button 512 may also be selected to navigate to other types of activities, such as booking travel or booking accommodation via the worker credential management application, or attending to time recording.

The work orders button 514 may be selected to present a list of work orders (e.g., all open work orders). The learning button 516 may be selected to access links to learning content and training materials assigned to the external worker 108.

The work permits button 518 may be selected to present one or more work permits or work site access authorizations obtained by the external worker 108. The digital ID button 520 may be selected to show the scannable digital code ("digital ID") of the external worker 108.

The worker credential management application may enable external workers and supervisors to collaborate while ensuring compliance with organizational policies around security, training, risk, or safety. By bringing together worker credentials from various sources (e.g., cloud-based data stores), the worker credential management application may provide a centralized view for users to manage profiles, view work assignments, complete onboarding tasks, and perform various other actions.

The worker credential management application may allow a supervisor to easily engage with and track their external workers. In some examples, the supervisor can scan or capture a digital code that uniquely identifies a profile of an external worker to gain access to worker credentials, onboarding information, task details, or outstanding requirements, thus improving the overall efficiency of an external worker management system.

Figure 6:
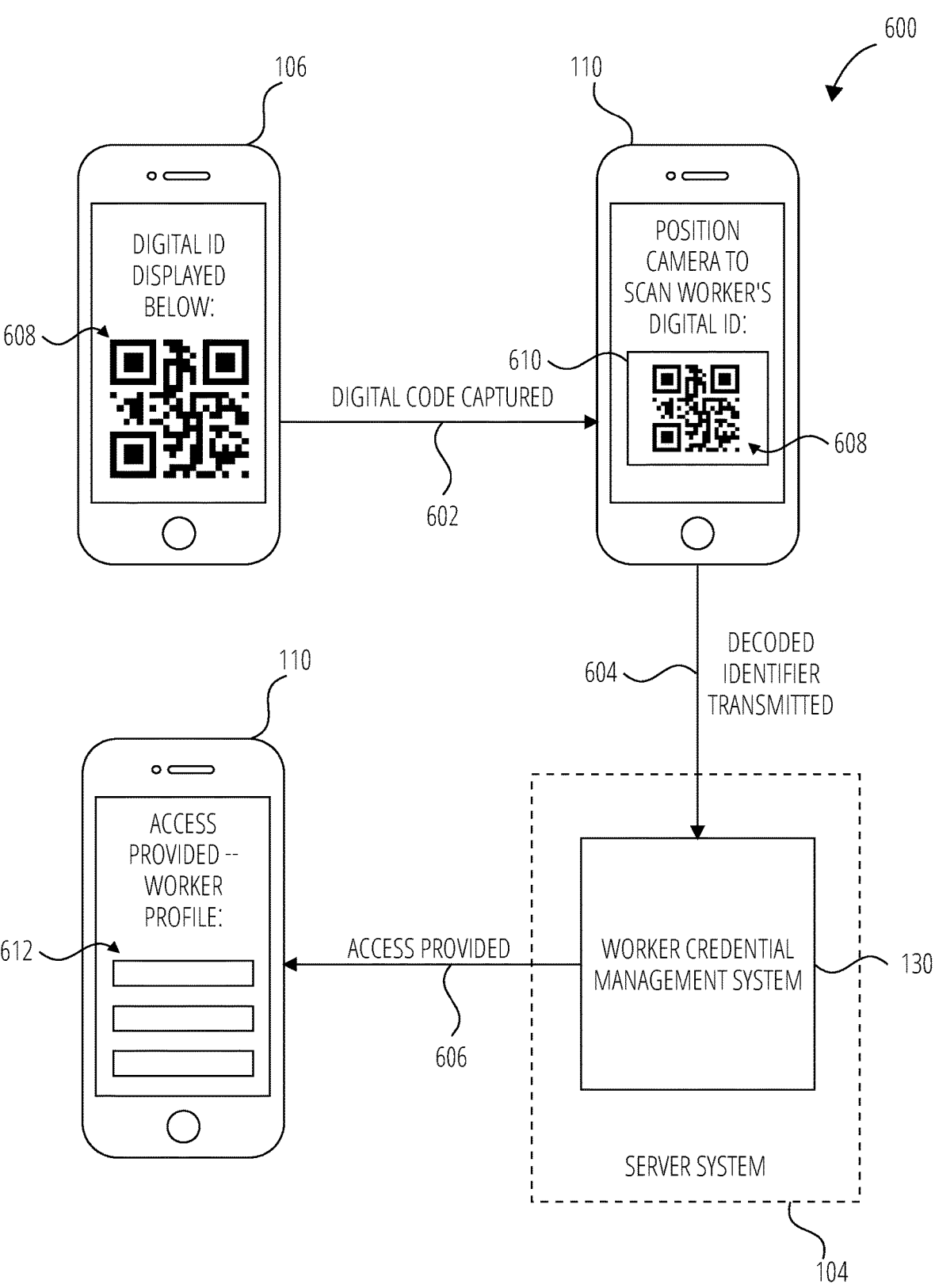
FIG. 6 is an interaction diagram illustrating interactions between a first device associated with a first profile, a second device associated with a second profile, and a server system that provides a worker credential management application, according to some examples.

FIG. 6 is an interaction diagram 600 that illustrates interactions between a first device associated with a first profile, a second device associated with a second profile, and a server system that provides a worker credential management application, according to some examples. In the example of FIG. 6, the first device is the user device 106 of the external worker 108 of FIG. 1, the second device is the user device 110 of the supervisor 112 of FIG. 1, and the server system is the server system 104 of FIG. 1.

The user device 106 displays a digital code 608 via the worker credential management application that identifies the worker profile of the external worker 108. The digital code 608 is displayed as a QR code via a GUI of the worker credential management application in the example of FIG. 6. For example, the QR code may encode a unique identifier of the external worker 108 or of a profile of the external worker 108.

At capturing operation 602 in FIG. 6, the user device 110 accesses the worker credential management application and captures the digital code 608. The worker credential management application on the user device 110 provides a viewfinder block 610 in which a real-time camera feed of the user device 110 is displayed to facilitate capturing of the digital code 608, as shown in FIG. 6.

After capturing the digital code 608, the user device 110 of the supervisor 112 decodes the digital code 608 to obtain a decoded identifier of the worker profile of the external worker 108. At transmitting operation 604, the user device 110 transmits the decoded information to the server system 104, where the information is received by the worker credential management system 130. In other examples, decoding may be performed at the server system 104 instead of at the user device 110.

As described elsewhere, the worker credential management system 130 may then detect, based on an existing association or other relationship between the worker profile of the external worker 108 and a supervisor profile of the supervisor 112, that the user device 110 may be enabled to access the worker profile. For example, the worker credential management system 130 may check the database 134 to confirm that a supervisor-worker relationship is flagged with respect to the two profiles or the two users in the database 134.

At access providing operation 606 of FIG. 6, the worker credential management system 130 then provides the user device 110 with access to the worker profile. For example, a GUI on the user device 110 may be automatically updated to present a set of worker credentials 612 of the external worker 108. For example, the GUI may display the text "Access Provided," along with a name, qualifications, training status, contact information, and any outstanding activities of the external worker 108.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: assigning a request to a first profile identified by a first identifier in the request, the first profile comprising worker credentials; storing an association between the first profile and a second profile identified by a second identifier in the request; encoding the first identifier into a digital code that is presentable by a first device associated with the first profile; detecting capturing, by a second device associated with the second profile, of the digital code presented by the first device; and in response to detecting the capturing of the digital code by the second device: identifying the association between the first profile and the second profile, and transmitting, based on the association between the first profile and the second profile, at least a subset of the worker credentials to the second device.

In Example 2, the subject matter of Example 1 includes, wherein the request identifies or comprises a work order, the operations further comprising: identifying a prerequisite for commencement of the work order; determining, based on the worker credentials in the first profile, that the prerequisite is not met; in response to determining that the prerequisite is not met, identifying an outstanding activity corresponding to the prerequisite; assigning the outstanding activity to the first profile; and transmitting, to the first device, a notification indicative of the outstanding activity.

In Example 3, the subject matter of Example 2 includes, wherein the notification is a first notification, the operations further comprising: transmitting, to the second device, a second notification indicative of the outstanding activity.

In Example 4, the subject matter of any of Examples 1-3 includes, the operations further comprising: receiving the first identifier from the second device subsequent to the capturing of the digital code by the second device, the first identifier having been decoded at the second device; and using the first identifier to retrieve the subset of the worker credentials.

In Example 5, the subject matter of any of Examples 1~4 includes, wherein the digital code comprises a barcode.

In Example 6, the subject matter of Example 5 includes, wherein the barcode is a QR code.

In Example 7, the subject matter of any of Examples 1-6 includes, wherein the digital code is presentable by the first device via a first instance of a client application executing at the first device, and the digital code is captured by the second device via a second instance of the client application executing at the second device.

In Example 8, the subject matter of Example 7 includes, wherein the subset of the worker credentials is a first subset of the worker credentials, the operations further comprising: identifying, based on an offline availability rule associated with the first profile, a second subset of the worker credentials; and causing, via the first instance of the client application, the second subset of the worker credentials to be stored locally on the first device.

In Example 9, the subject matter of any of Examples 1-8 includes, wherein the worker credentials comprise at least one of: worker identity credentials, worker onboarding credentials, worker task credentials, worker compliance credentials, worker training credentials, or worker access credentials.

In Example 10, the subject matter of Example 9 includes, wherein the request identifies or comprises a work order, the worker credentials include the worker access credentials and the work order includes work site data, the operations further comprising: generating, based on the work site data, a work site access authorization; and including the work site access authorization in the worker access credentials, the work site access authorization forming part of the subset of the worker credentials transmitted to the second device.

In Example 11, the subject matter of any of Examples 1-10 includes, the operations further comprising: accessing a plurality of cloud-based credential stores; and using the first identifier to retrieve at least some of the worker credentials from the plurality of cloud-based credential stores.

In Example 12, the subject matter of any of Examples 1-11 includes, wherein the first profile is an external worker profile and the second profile is a supervisor profile, the second device being enabled to access the subset of the worker credentials based on the association between the external worker profile and the supervisor profile.

In Example 13, the subject matter of Example 12 includes, the operations further comprising: storing the association between the external worker profile and the supervisor profile in a database, the supervisor profile being associated with a plurality of other external worker profiles in the database.

In Example 14, the subject matter of any of Examples 1-13 includes, wherein the first profile is an external worker profile and the second profile is a supervisor profile that comprises supervisor credentials, the operations further comprising: in response to assigning of the request to the first profile, transmitting at least a subset of the supervisor credentials to the first device.

Example 15 is a method comprising: assigning a request to a first profile identified by a first identifier in the request, the first profile comprising worker credentials; storing an association between the first profile and a second profile identified by a second identifier in the request; encoding the first identifier into a digital code that is presentable by a first device associated with the first profile; detecting capturing, by a second device associated with the second profile, of the digital code presented by the first device; and in response to detecting the capturing of the digital code by the second device: identifying the association between the first profile and the second profile, and transmitting, based on the association between the first profile and the second profile, at least a subset of the worker credentials to the second device.

In Example 16, the subject matter of Example 15 includes, wherein the request identifies or comprises a work order, the method comprising identifying a prerequisite for commencement of the work order; determining, based on the worker credentials in the first profile, that the prerequisite is not met; in response to determining that the prerequisite is not met, identifying an outstanding activity corresponding to the prerequisite; assigning the outstanding activity to the first profile; and transmitting, to the first device, a notification indicative of the outstanding activity.

In Example 17, the subject matter of any of Examples 15-16 includes, the method further comprising: receiving the first identifier from the second device subsequent to the capturing of the digital code by the second device, the first identifier having been decoded at the second device; and using the first identifier to retrieve the subset of the worker credentials.

Example 18 is a non-transitory computer-readable medium that stores instructions that, when executed by one or more processors, cause the one or more processors to perform operations comprising: assigning a request to a first profile identified by a first identifier in the request, the first profile comprising worker credentials; storing an association between the first profile and a second profile identified by a second identifier in the request; encoding the first identifier into a digital code that is presentable by a first device associated with the first profile; detecting capturing, by a second device associated with the second profile, of the digital code presented by the first device; and in response to detecting the capturing of the digital code by the second device: identifying the association between the first profile and the second profile, and transmitting, based on the association between the first profile and the second profile, at least a subset of the worker credentials to the second device.

In Example 19, the subject matter of Example 18 includes, wherein the request identifies or comprises a work order, the operations further comprising: identifying a prerequisite for commencement of the work order; determining, based on the worker credentials in the first profile, that the prerequisite is not met; in response to determining that the prerequisite is not met, identifying an outstanding activity corresponding to the prerequisite; assigning the outstanding activity to the first profile; and transmitting, to the first device, a notification indicative of the outstanding activity.

In Example 20, the subject matter of any of Examples 18-19 includes, the operations further comprising: receiving the first identifier from the second device subsequent to the capturing of the digital code by the second device, the first identifier having been decoded at the second device; and using the first identifier to retrieve the subset of the worker credentials.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 7:
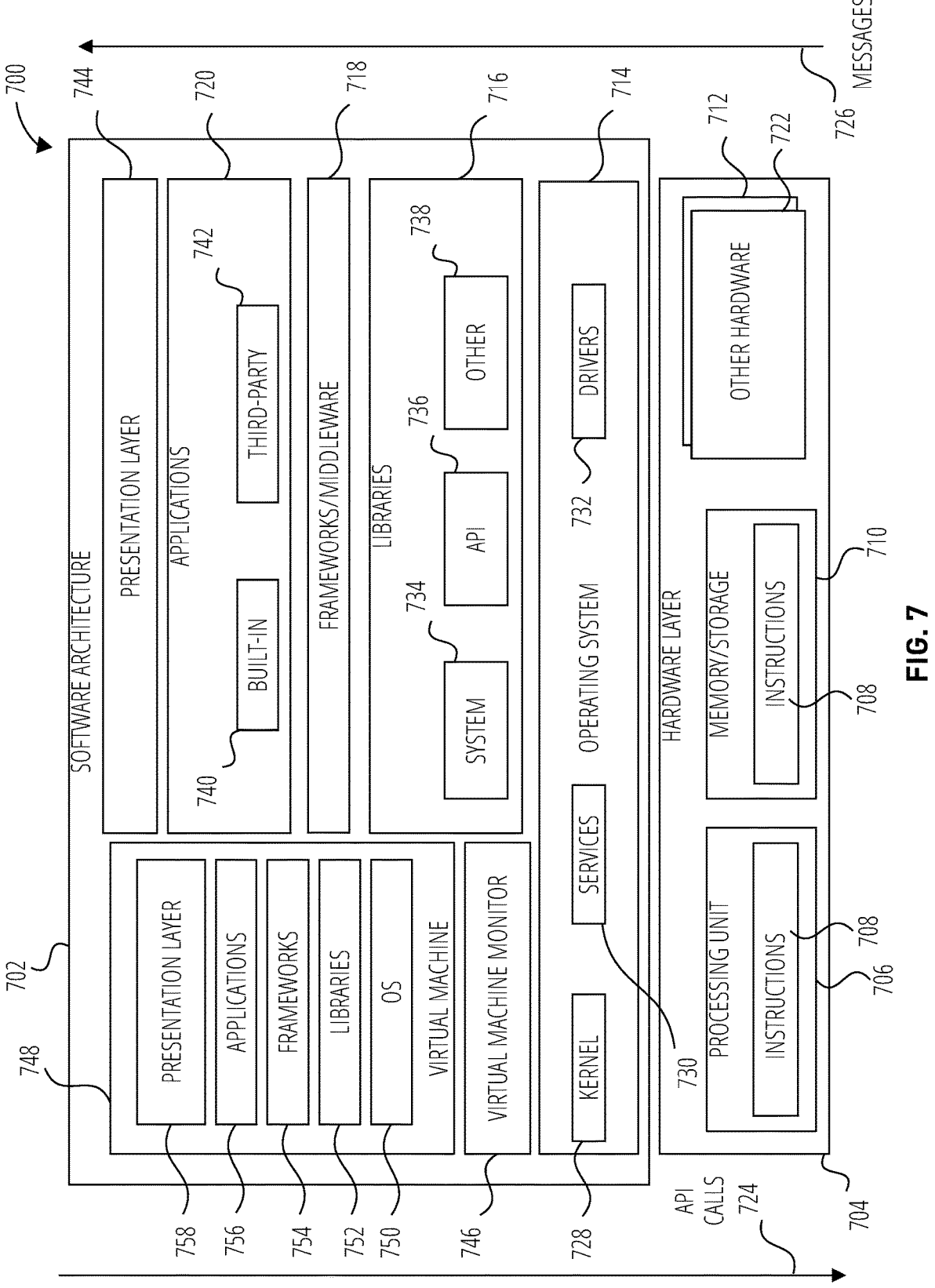
FIG. 7 is a block diagram showing a software architecture for a computing device, according to some examples.

FIG. 7 is a block diagram 700 showing a software architecture 702 for a computing device, according to some examples. The software architecture 702 may be used in conjunction with various hardware architectures, for example, as described herein. FIG. 7 is merely a non-limiting illustration of a software architecture, and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 and other hardware 722 which represent any other hardware of the hardware layer 704, such as the other hardware illustrated as part of the software architecture 702.

In the architecture of FIG. 7, the software architecture 702 may be conceptualized as a stack of layers where each layer provides particular functionality. For example, the software architecture 702 may include layers such as an operating system 714, libraries 716, frameworks/middleware layer 718, applications 720, and presentation layer 744. Operationally, the applications 720 or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the software architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 716 may provide a common infrastructure that may be utilized by the applications 720 or other components or layers. The libraries 716 typically provide functionality that allows other software modules to perform tasks in an easier fashion than to interface directly with the underlying operating system 714 functionality (e.g., kernel 728, services 730 or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware layer 718 may provide a higher-level common infrastructure that may be utilized by the applications 720 or other software components/modules. For example, the frameworks/middleware layer 718 may provide various graphic user interface (GUI) functions, high-level resource management, high-level location services, and so forth. The frameworks/middleware layer 718 may provide a broad spectrum of other APIs that may be utilized by the applications 720 or other software components/modules, some of which may be specific to a particular operating system or platform.

The applications 720 include built-in applications 740 or third-party applications 742. Examples of representative built-in applications 740 may include, but are not limited to, a contacts application, a browser application, a book reader application, a location application, a media application, a messaging application, or a game application. Third-party applications 742 may include any of the built-in applications as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built in operating system functions (e.g., kernel 728, services 730 or drivers 732), libraries (e.g., system libraries 734, API libraries 736, and other libraries 738), and frameworks/middleware layer 718 to create user interfaces to interact with users of the system. Alternatively, or additionally, in some systems, interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine as well as the interface with the host operating system (e.g., operating system 714). A software architecture executes within the virtual machine 748 such as an operating system 750, libraries 752, frameworks/middleware 754, applications 756 or presentation layer 758. These layers of software architecture executing within the virtual machine 748 can be the same as corresponding layers previously described or may be different.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 8:
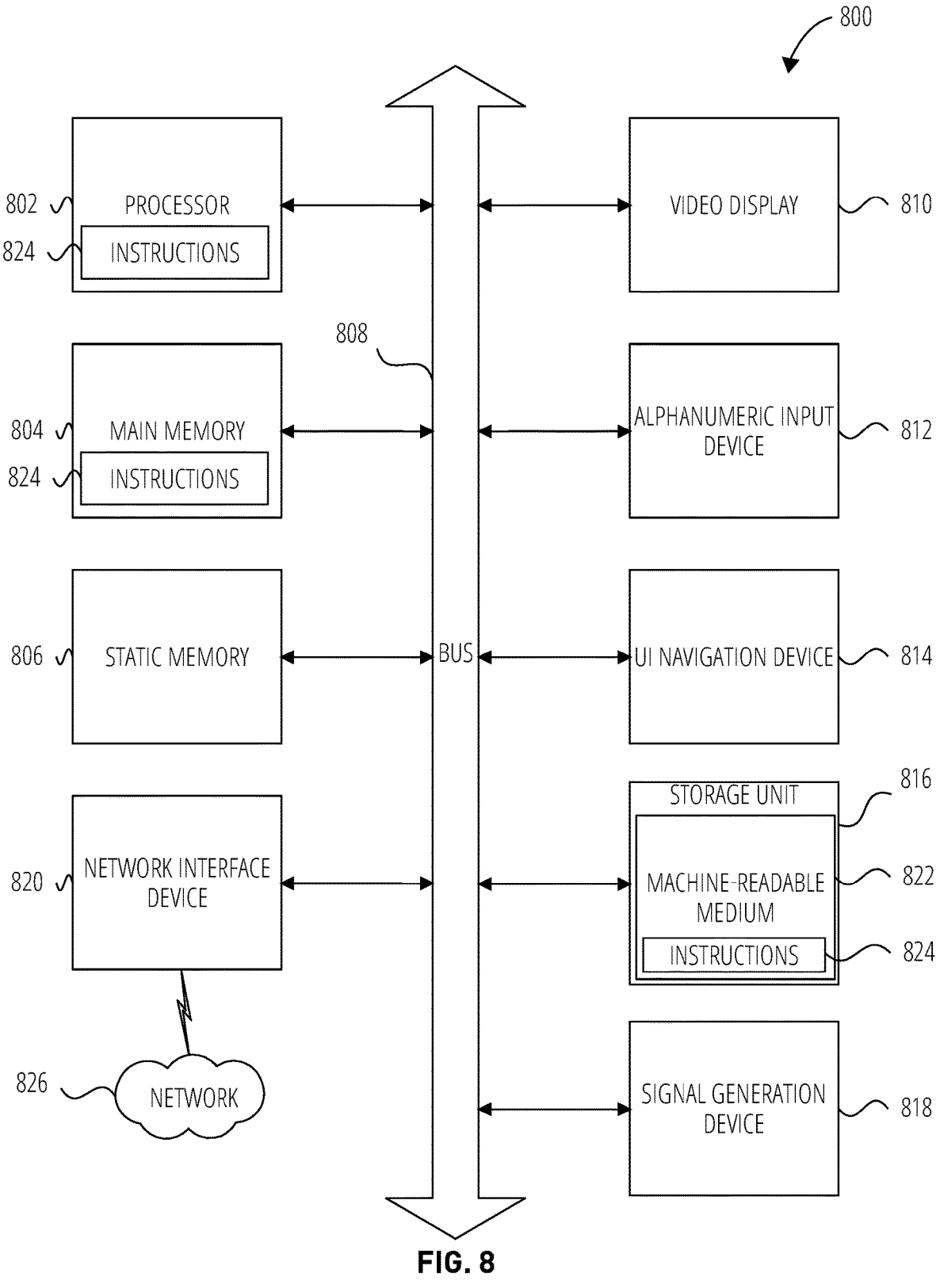
FIG. 8 is a block diagram of a machine in the form of a computer system, according to some examples, within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a GPU, or both), a primary or main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a UI navigation (or cursor control) device 814 (e.g., a mouse), a storage unit 816, a signal generation device 818 (e.g., a speaker), and a network interface device 820.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 or within the processor 802 during execution thereof by the computer system 800, with the main memory 804 and the processor 802 also each constituting a machine-readable medium 822.

While the machine-readable medium 822 is shown in accordance with some examples to be a single medium, the term "machine-readable medium" may include a single medium or multiple media (e.g., a centralized or distributed database, or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of a machine-readable medium 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 824 may further be transmitted or received over a communications network 826 using a transmission medium. The instructions 824 may be transmitted using the network interface device 820 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 824 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:
at least one memory that stores instructions; and
one or more processors configured by the instructions to perform operations comprising:
assigning a request to a first profile identified by a first identifier in the request, the first profile comprising worker credentials and the request identifying a work order;
storing an association between the first profile and a second profile identified by a second identifier in the request;
identifying a prerequisite for commencement of the work order;
determining, based on the worker credentials in the first profile, that the prerequisite is not met;
assigning an outstanding activity to the first profile, the outstanding activity corresponding to the prerequisite;
transmitting, to a first device associated with the first profile, a notification indicative of the outstanding activity;
encoding the first identifier into a digital code that is presentable by the first device associated with the first profile;
detecting capturing, by a second device associated with the second profile, of the digital code presented by the first device; and
based on detecting the capturing of the digital code by the second device:
identifying the association between the first profile and the second profile, and
transmitting, based on the association between the first profile and the second profile,
at least a subset of the worker credentials to the second device.

2. The system of claim 1, wherein the notification is a first notification, the operations further comprising:
transmitting, to the second device, a second notification indicative of the outstanding activity.

3. The system of claim 1, the operations further comprising:
receiving the first identifier from the second device subsequent to the capturing of the digital code by the second device, the first identifier having been decoded at the second device; and
using the first identifier to retrieve the subset of the worker credentials.

4. The system of claim 1, wherein the digital code comprises a barcode.

5. The system of claim 4, wherein the barcode is a Quick Response (QR) code.

6. The system of claim 1, wherein the digital code is presentable by the first device via a first instance of a client application executing at the first device, and the digital code is captured by the second device via a second instance of the client application executing at the second device.

7. The system of claim 6, wherein the subset of the worker credentials is a first subset of the worker credentials, the operations further comprising:

identifying, based on an offline availability rule associated with the first profile, a second subset of the worker credentials; and causing, via the first instance of the client application, the second subset of the worker credentials to be stored locally on the first device.

8. The system of claim 1, wherein the worker credentials comprise at least one of: worker identity credentials, worker onboarding credentials, worker task credentials, worker compliance credentials, worker training credentials, or worker access credentials.

9. The system of claim 8, wherein the worker credentials include the worker access credentials and the work order includes work site data, and the operations further comprising:

generating, based on the work site data, a work site access authorization; and including the work site access authorization in the worker access credentials, the work site access authorization forming part of the subset of the worker credentials transmitted to the second device.

10. The system of claim 1, the operations further comprising:

accessing a plurality of cloud-based credential stores; and using the first identifier to retrieve at least some of the worker credentials from the plurality of cloud-based credential stores.

11. The system of claim 1, wherein the first profile is an external worker profile and the second profile is a supervisor profile, the second device being enabled to access the subset of the worker credentials based on the association between the external worker profile and the supervisor profile.

12. The system of claim 11, the operations further comprising:

storing the association between the external worker profile and the supervisor profile in a database, the supervisor profile being associated with a plurality of other external worker profiles in the database.

13. The system of claim 1, wherein the first profile is an external worker profile and the second profile is a supervisor profile that comprises supervisor credentials, the operations further comprising:

in response to assigning of the request to the first profile, transmitting at least a subset of the supervisor credentials to the first device.

14. A method comprising:

assigning a request to a first profile identified by a first identifier in the request, the first profile comprising worker credentials and the request identifying a work order;

storing an association between the first profile and a second profile identified by a second identifier in the request;

identifying a prerequisite for commencement of the work order;

determining, based on the worker credentials in the first profile, that the prerequisite is not met;

assigning an outstanding activity to the first profile, the outstanding activity corresponding to the prerequisite;

transmitting, to a first device associated with the first profile, a notification indicative of the outstanding activity:

encoding the first identifier into a digital code that is presentable by the first device associated with the first profile;

detecting capturing, by a second device associated with the second profile, of the digital code presented by the first device; and based on detecting the capturing of the digital code by the second device:

identifying the association between the first profile and the second profile, and transmitting, based on the association between the first profile and the second profile, at least a subset of the worker credentials to the second device.

15. The method of claim 14, wherein the request identifies a work order, the method further comprising:

identifying a prerequisite for commencement of the work order;

determining, based on the worker credentials in the first profile, that the prerequisite is not met;

in response to determining that the prerequisite is not met, identifying an outstanding activity corresponding to the prerequisite;

assigning the outstanding activity to the first profile; and transmitting, to the first device, a notification indicative of the outstanding activity.

16. A non-transitory computer-readable medium that stores instructions that, when executed by one or more processors, cause the one or more processors to perform operations comprising:

assigning a request to a first profile identified by a first identifier in the request, the first profile comprising worker credentials and the request identifying a work order;

storing an association between the first profile and a second profile identified by a second identifier in the request;

identifying a prerequisite for commencement of the work order;

determining, based on the worker credentials in the first profile, that the prerequisite is not met;

assigning an outstanding activity to the first profile, the outstanding activity corresponding to the prerequisite;

transmitting, to a first device associated with the first profile, a notification indicative of the outstanding activity;

encoding the first identifier into a digital code that is presentable by the first device associated with the first profile;

detecting capturing, by a second device associated with the second profile, of the digital code presented by the first device; and based on detecting the capturing of the digital code by the second device:

identifying the association between the first profile and the second profile, and transmitting, based on the association between the first profile and the second profile, at least a subset of the worker credentials to the second device.

17. The non-transitory computer-readable medium of claim 16, the operations further comprising:

receiving the first identifier from the second device subsequent to the capturing of the digital code by the second device, the first identifier having been decoded at the second device; and using the first identifier to retrieve the subset of the worker credentials.

18. The method of claim 14, wherein the second profile is a supervisor profile, the second device being enabled to access the subset of the worker credentials based on the association between the first profile and the supervisor profile.

19. The method of claim 18, wherein the first profile is an external worker profile, the method further comprising storing the association between the external worker profile and the supervisor profile in a database, the supervisor profile being associated with a plurality of other external worker profiles in the database.

20. The method of claim 14, wherein the worker credentials include worker access credentials and the work order includes work site data, the method further comprising:

generating, based on the work site data, a work site access authorization; and including the work site access authorization in the worker access credentials, the work site access authorization forming part of the subset of the worker credentials transmitted to the second device.

* * * * *